United States Patent
Batra et al.

(10) Patent No.: US 11,650,853 B2
(45) Date of Patent: May 16, 2023

(54) SYSTEMS AND METHODS FOR MANAGING RESOURCES IN RESOURCE-CONSUMING COMPUTATIONAL SYSTEMS AND PROCESSES

(71) Applicant: INTERNATIONAL BUSINESS MACHINES CORPORATION, Armonk, NY (US)

(72) Inventors: Pankaj Batra, Boston, MA (US); Evan Frenn, Boston, MA (US); Eric Gandt, Boston, MA (US); David Ohsie, Boston, MA (US); Peter Sweeney, Boston, MA (US); Sankar Veeramoni, Boston, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 7 days.

(21) Appl. No.: 17/205,277

(22) Filed: Mar. 18, 2021

(65) Prior Publication Data
US 2022/0300337 A1 Sep. 22, 2022

(51) Int. Cl.
*G06F 9/455* (2018.01)
*G06F 9/50* (2006.01)

(52) U.S. Cl.
CPC ........ *G06F 9/5055* (2013.01); *G06F 9/45533* (2013.01)

(58) Field of Classification Search
CPC .......................... G06F 9/5055; G06F 9/45533
See application file for complete search history.

*Primary Examiner* — Gregory A Kessler
(74) *Attorney, Agent, or Firm* — Rakesh Roy (57) ABSTRACT

Various approaches for allocating resources to multiple virtual machines include identifying multiple reserved instances, each specifying a quantity of one or more computational resources compatible with the feasible resource template for the VMs; computationally generating, for each of the VMs, an instance-ranking list indicating a ranking order of the reserved instances having templates feasible for the VM; computationally generating, for each of the reserved instances, a VM-ranking list indicating a ranking order of the VMs to which the resources specified by the reserved instance may be allocated; and based at least in part on the instance-ranking list and the VM-ranking list, computationally mapping each of the VMs to one of the reserved instances.

16 Claims, 5 Drawing Sheets

VM PREFERENCES

| VM$_1$ | RI$_1$ | RI$_2$ | RI$_3$ |
|---|---|---|---|
| VM$_2$ | RI$_1$ | RI$_3$ | RI$_2$ |
| VM$_3$ | RI$_3$ | RI$_1$ | RI$_2$ |
| VM$_4$ | RI$_1$ | RI$_3$ | RI$_2$ |

FIG. 2B

RI PREFERENCES

| RI$_1$ | VM$_1$ | VM$_4$ | VM$_3$ | VM$_2$ |
|---|---|---|---|---|
| RI$_2$ | VM$_1$ | VM$_3$ | VM$_2$ | VM$_4$ |
| RI$_3$ | VM$_1$ | VM$_3$ | VM$_4$ | VM$_2$ |

SYSTEMS AND METHODS FOR MANAGING RESOURCES IN RESOURCE-CONSUMING COMPUTATIONAL SYSTEMS AND PROCESSES

FIELD OF THE INVENTION

The present invention relates, generally, to resource-consuming computational systems and processes, and more particularly to systems and methods for managing resources in such systems and processes.

BACKGROUND

Traditional computer system architectures typically include one or more dedicated computer servers for each application being run, and are often designed to include an excessive allocation of resources—for example, physical components such as central processing units (CPUs) and storage—in order to ensure the ability to handle peak demands. Such resource overloading can be costly, inefficient and difficult to scale and manage.

So-called "cloud" providers offer various elements of computational infrastructure and processing capacity and services (e.g., applications, licenses, etc.) as a service via the internet. The term "cloud" connotes the arbitrary location of the physical or software resources corresponding to the offered services; these are determined by the cloud provider and may be altered to suit the provider's changing customer demands and service-level commitments, all in a manner invisible to those customers. In concept, cloud services are analogous to virtualization, which refers to the abstraction of computer resources from their hardware or software-based physical constructs. Virtualization may be based on one or more virtual machines (VMs), each of which is a software implementation of a computer that executes programs or applications as if it were a physical computer. A virtual machine operates like a physical computer and contains, for example, its own virtual (e.g., software-based) CPU, random access memory (RAM), hard disk storage, and network interface card (NIC). Each virtual machine in a virtualization system generally runs its own guest operating system (OS), and the virtual machines generally share the underlying physical machine resources of the system. Virtualization generally involves the use of physical resources belonging to a single entity and for which that entity is responsible, so virtualization facilitates more efficient use of existing resources rather than "offloading" the expansion of resources to an outside provider. VMs may be deployed on premises or in the cloud.

There are many potential benefits to cloud services, most obviously the ability to avoid capital investment in infrastructure whose utilization can vary. Often that variation is predictable, e.g., the pronounced spike in resource utilization by retailers during the holiday season, in which case there is time for advance planning and comparison among cloud offerings. Even when demand fluctuations are not predictable, however, cloud resources can be added and, within contract restrictions, decommissioned on demand. Cloud services can also be used to improve the availability and robustness of applications by shifting workloads to the cloud provider to handle fail-over situations, improve load balancing, and provide storage resiliency. Similarly, cloud computing provides flexible partitioning of applications, deployment, and operations.

Cloud providers often price services based on a reserved quantity of computational resources regardless of whether all reserved resources are actually consumed. For example, the price for utilizing 10% or 90% of a particular cloud compute instance (having, e.g., 16 GB of memory, 4 virtual CPUs and 10 Gbps of network bandwidth) is the same. To optimize performance and save cost in such an environment, a local management system may suffice—i.e., the consumer may simply choose the cheapest instance type that has the resources sufficient execute the workload. For example, if a workload utilizes only 20% of all resources of a given compute instance type (e.g., "type A") and the consumer wishes to limit the maximum utilization rate of the resources to 80%, the consumer may save money by choosing the cheapest version of an instance type (e.g., "type B") having as little as ¼ the resources of the instance type A. (The "utilization rate" refers to the fraction of available resources actually used to execute a workload.)

This local optimization scheme, however, may fail in the case of prepaid agreements for a fixed amount of reserved resources over a period of time. For example, AMAZON Web Services (AWS) provides the consumer with some cost savings on prepaid reservations for a fixed time period (e.g., one year or three years) compared to on-demand instance pricing. If the consumer has prepaid for a one-year reservation of instance type A in the above example, the cloud provider may not permit changing the compute instance to a different type during the term, so shifting to a different instance may not be possible until the term expires. Even if the cloud provider permits the change, the consumer may forfeit any discount associated with the reserved instance, so the shift to a different instance may still be economically unattractive.

Accordingly, a need exists for efficient and economic resource management in cloud-based computational systems and processes in the presence of prepaid, discounted resource reservations.

SUMMARY

The present invention relates to optimizing computational resource allocation efficiently and economically by allocating fixed-term computational resources to multiple resource-consuming computational systems and/or processes. Embodiments of the invention account for the presence of a promotion (e.g., some form of discount applied by the cloud provider to the resource reservation). As used herein, the term "computational resource" refers to processing, storage, functional (e.g., database), infrastructure (e.g., network) or other hardware (e.g., CPU or memory) or software that supports local or distributed execution of a computational workload. The resource-consuming computational systems may include, for example, VMs, and the processes may include applications as well as the lower-level computational entities (e.g., an operating system) and structured data entities (e.g., a database) on which they operate. For ease of reference, the following description refers to VMs as the resource-consuming computational entities; it should be understood, however, that the same approach generally applies as well to other resource-consuming computational systems and/or processes (e.g., containers).

Typically, each VM is associated with a "feasible resource template" that represents a package of cloud-based computational resource offerings for executing the VM (that is, the workload that the VM represents). The provider of the template may base the offered price on current and projected resource availability and demand. Each template has an on-demand cost. In addition, the template price may be expressed as a reserved instance and may reflect a discount from the on-demand cost of the template resources; like an option, this represents the provider's estimate of resource supply and demand over the period of the reserved instance as well as the time value of advance payment. Although reserved instances, as described herein, generally reflect some form of promotion or discount relative to on-demand pricing, it should be stressed that this need not be the case, and moreover, the type of discount can vary widely. Generally, upon purchasing a template with a reserved instance, the consumer is committed to pay the discounted price for the fixed period of time regardless of how often and/or how much of the template resources are actually used.

In various embodiments, a management system first identifies, for each of the VMs, one or more reserved instances specifying templates that have quantities and/or types of computational resources feasible for executing the VM. Based thereon, an instance-ranking list indicating a ranking order of the identified reserved instances for each VM can be created. In addition, optimization may create, for each of the identified reserved instances, a VM-ranking list indicating a ranking order of the VMs to which the resources specified by the reserved instance may be allocated. The ranking orders in the instance-ranking list and/or the VM-ranking list can be based on one or more priority factors such as the cost saving (e.g., relative to on-demand pricing) associated with each reserved instance, any affinity (e.g., billing affinity, whereby charges for a candidate reserved instance would be added to a bill covering existing reserved instances, or other beneficial relationship (e.g., reducing the number of moves)) between one or more VMs and one or more reserved instances, the association between each VM and the instance type of each reserved instance, the association between each VM and the family of the instance type to which each reserved instance belongs, the usage constraint associated with each reserved instance, etc. In one embodiment, based on the instance-ranking list and the VM-ranking list, the management system can generate a mapping of each of the VMs to one of the reserved instances. Typically, one reserved instance can support one or more VMs. Based on the mapping, the computational resources can then be allocated from the templates specified by the reserved instances to the corresponding VMs. This approach may optimally match the reserved instances to the VMs so as to provide the largest cost savings while ensuring adequate VM performance (e.g., having a utilization rate of the computational resource below a target rate, having a latency below a target latency, etc.).

Accordingly, in one aspect, the invention pertains to a method of allocating resources to multiple VMs; each of the VMs is associated with a feasible resource template specifying minimum resources required to execute the VM. In various embodiments, the method includes identifying multiple reserved instances each specifying a quantity of one or more computational resources compatible with the feasible resource template for one or more of the VMs for a fixed time period; computationally generating, for each of the VMs, an instance-ranking list indicating a ranking order of the reserved instances having templates feasible for the VM; computationally generating, for each of the reserved instances, a VM-ranking list indicating a ranking order of the VMs to which the resources specified by the reserved instances may be allocated; and based at least in part on the instance-ranking list and the VM-ranking list, computationally mapping each of the VMs to one of the reserved instances and allocating the resources specified by at least some of the reserved instances to the corresponding VMs based on the mapping.

The ranking order of the reserved instances in the instance-ranking list and/or the ranking order of the VMs in the VM-ranking list may be determined based at least in part on a cost saving, an affinity between each of the VMs and each of the reserved instances, an association between each of the VMs and an instance type of each of the reserved instances, an association between each of the VMs and a family of the instance type to which each of the reserved instances belongs, and/or a usage constraint associated with each of the reserved instances. In one embodiment, for each of the reserved instances, the order of the VM-ranking list is determined based on the following order of priorities: (i) the cost saving associated with each of the VMs, (ii) the affinity between said reserved instance and each of the VMs, (iii) the association between the instance type of said reserved instance and the VMs, and (iv) the association between the family of the instance type to which said reserved instance belongs to and the VMs. In addition, for each of the VMs, the ranking order of the reserved instances in the instance-ranking list may be determined based on the following order of priorities: (i) the cost saving associated with each of the reserved instances, (ii) the affinity between said VM and each of the reserved instances, (iii) the usage constraint associated with each of the reserved instances, and (iv) the association between said VM and the instance type of each of the reserved instances.

The computational resources specified by each of the reserved instances may be allocated to a different one of the VMs. In some embodiments, the computational resources specified by one of the reserved instances are allocated to two or more of the VMs. In addition, the mapping may be computationally generated using Gale-Shapley algorithm. In one embodiment, the resource(s) are selected from CPUs, memory, databases, network bandwidth, and/or input-output capacity.

In another aspect, the invention relates to a computer system for allocating resources to multiple VMs; each of the VMs is associated with a feasible resource template specifying minimum resources required to execute the VM. In various embodiments, the computer system includes a processor and a computer memory including stored instructions, executable by the processor, for causing the processor to identify multiple reserved instances, each specifying a quantity of one or more computational resources compatible with the feasible resource template for one or more of the VMs for a fixed time period; generate, for each of the VMs, an instance-ranking list indicating a ranking order of the reserved instances having templates feasible for the VM; generate, for each of the reserved instances, a VM-ranking list indicating a ranking order of the VMs to which the resources specified by the reserved instances may be allocated; based at least in part on the instance-ranking list and the VM-ranking list, map each of the VMs to one of the reserved instances; and allocate the resources specified by at least some of the reserved instances to the corresponding VMs based on the mapping.

The ranking order of the reserved instances in the instance-ranking list and/or the ranking order of the VMs in the VM-ranking list may be determined based at least in part on a cost saving, an affinity between each of the VMs and each of the reserved instances, an association between each of the VMs and an instance type of each of the reserved instances, an association between each of the VMs and a family of the instance type to which each of the reserved instances belongs, and/or a usage constraint associated with each of the reserved instances. In one embodiment, for each of the reserved instances, the order of the VM-ranking list is determined based on the following order of priorities: (i) the cost saving associated with each of the VMs, (ii) the affinity between said reserved instance and each of the VMs, (iii) the association between the instance type of said reserved instance and the VMs, and (iv) the association between the family of the instance type to which said reserved instance belongs to and the VMs. In addition, for each of the VMs, the ranking order of the reserved instances in the instance-ranking list may be determined based on the following order of priorities: (i) the cost saving associated with each of the reserved instances, (ii) the affinity between said VM and each of the reserved instances, (iii) the usage constraint associated with each of the reserved instances, and (iv) the association between said VM and the instance type of each of the reserved instances.

The computational resources specified by each of the reserved instances may be allocated to a different one of the VMs. In some embodiments, the computational resources specified by one of the reserved instances are allocated to two or more of the VMs. In addition, the processor may be further configured to computationally map each of the VMs to one of the reserved instances using Gale-Shapley algorithm. In one embodiment, the resource(s) are selected from CPUs, memory, databases, network bandwidth, and/or input-output capacity.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1:
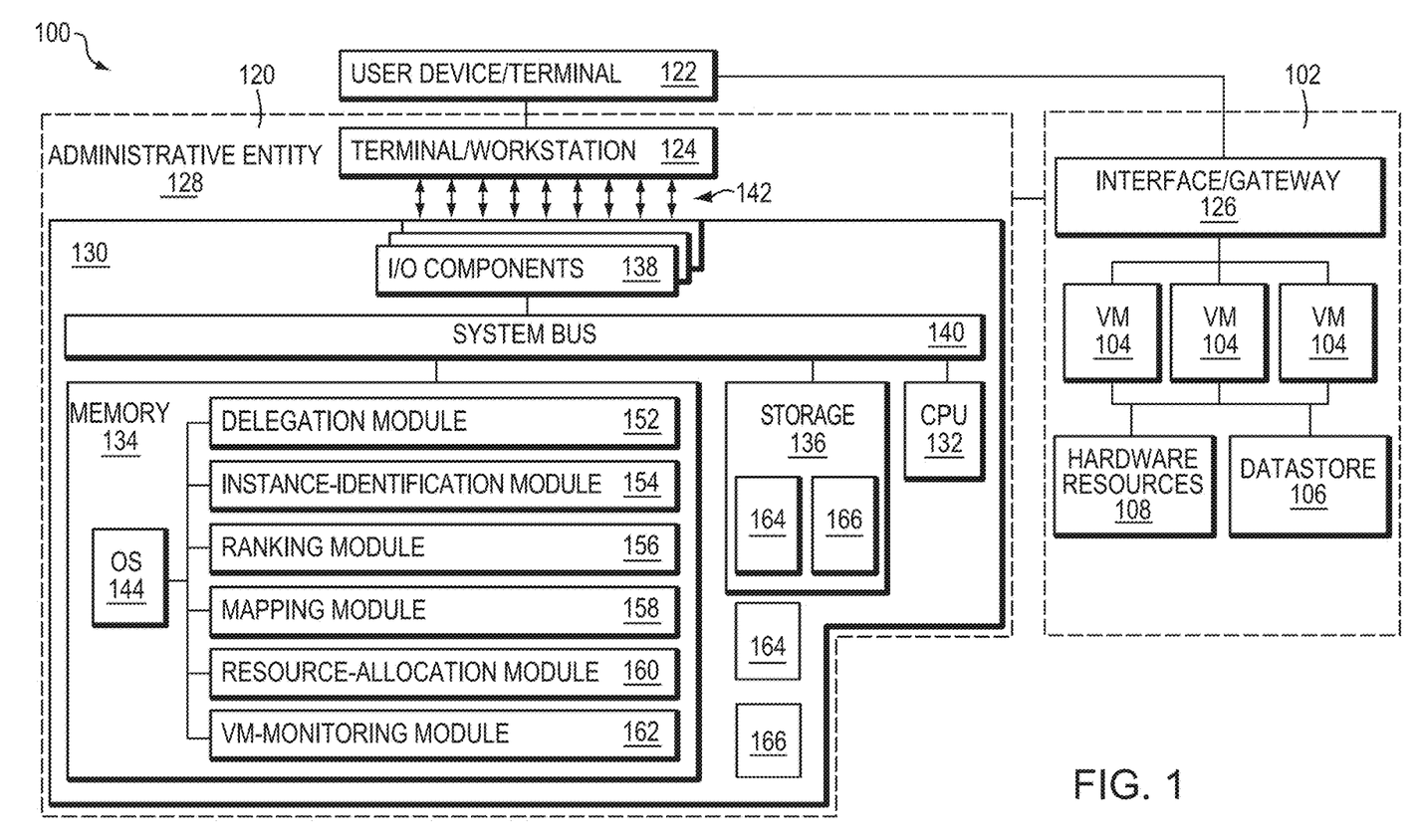
FIG. 1 schematically depicts an exemplary cloud-based computing environment in accordance with various embodiments of the current invention.

FIG. 1 schematically shows an exemplary cloud service system 100 including a cloud-computing service provider 102 for providing an infrastructure platform upon which a cloud environment can be supported. The platform may include one or more resource-consuming computational systems and/or processes 104 (e.g., VMs), a datastore 106, and hardware resources 108 configured to control and support operations of the resource-consuming computational systems and/or processes 104 in the cloud environment. The resource-consuming computational systems may include, for example, VMs, containers and/or physical computers. The resource-consuming computational processes may include applications as well as the lower-level computational entities and processes (e.g., an operating system) and structured data entities (e.g., a database) on which they operate, since even these lower-level entities have resource requirements that can be considered separately from (although reflecting the demands of) various applications that use them. At a higher level, a VM is a computational process that emulates a machine executing numerous application-level processes that themselves use lower-level entities. As noted previously, although the following description refers to VMs as exemplary resource-consuming computational systems and/or processes 104, the same approach for allocation of the computational resources generally applies as well to other resource-consuming computational systems and/or processes.

Typically, each of the VMs 104 is associated with a feasible resource template that represents a package of cloud-based computational resource offerings (e.g., CPUs, memory, databases, network bandwidth, input-output capacity, etc.) sufficient to execute the VM. A template specifies a set of resources offered by one or more cloud providers for a known price. Generally, the price of a template is based on supply (resource availability) and demand. A template may be sold for a specified time period, typically at a discount (e.g., a reserved instance) to the on-demand price, reflecting the provider's estimate of resource supply and demand over the period of the reserved instance as well as the time value of advance payment. For example, the elastic compute cloud (EC2) offered by AWS may be discounted from on-demand instance pricing by up to 72%, and can be purchased for a fixed time period (e.g., 1 year or 3 years). The reserved instances provided by the cloud-service provider 102 typically include a wide selection of instance types and/or sizes that can be chosen to fit different needs. Instance types include various combinations of computational resources such as CPU, memory, storage, and networking capacity, allowing the user to choose the appropriate mix of resources for executing a workload. Thus, a consumer wishing to run a workload on the cloud environment can pick an appropriate instance type in terms of sufficient computational resources, time period, and price.

Generally, upon purchasing a template with a reserved instance, the consumer is committed to pay the discounted price for the fixed period of time regardless of actual the utilization. Thus, it is imperative to allocate the computational resources from the templates specified by the reserved instances to the VMs in an economically efficient manner, balancing cost with resources sufficient to satisfy performance requirements. In addition, because resource requirements associated with a workload may change—indeed, the workload itself may predictably evolve over time—it may be desirable to monitor actual resource utilization over time as the workload executes so that resource purchases can be continuously directed to the most economically advantageous reserved instances.

In various embodiments, users/developers can create one or more computing workloads (consisting of applications, for example) and then rely on a management system 120 to allocate appropriate computational resources from the templates specified by the reserved instances to the VMs 104 for executing the workloads as further described below. The management system 120 is configured to enable users to develop and deploy the workload via user devices and/or terminals 122. The management system 120 may create, develop, troubleshoot, and/or upload the workload to the infrastructure platform provided by the cloud-service provider 102 using, for example, a terminal and/or workstation 124 at the system side and an interface or gateway 126 designated as the frontend at the service-provider side. In a typical deployment, the management system 120 is a customer of the service provider 102, whereas the users represented by terminals 122 are customers of the management system 120. At the same time, terminals 122 are clients of the cloud environment.

The management system 120 may also include an automated administrative entity 128 for managing and supporting execution of the workload. In one embodiment, the administrative entity 128 includes a networked computer 130 having a CPU 132, a memory 134 (which can be implemented as any type of volatile memory, such as SDRAM, or non-volatile, such as Flash memory), a storage device 136 (such as a magnetic, solid-state, or flash disk), and one or more input/output (I/O) components (e.g., a network I/O resource, I/O pathways, etc.) 138. The CPU 132 may be configurable to host one or more virtual machines and/or run various processes to manage and support execution of the computing application/workload as further described below. In addition, the CPU 132 may provide the various computational functions described below through software, hardware, firmware, hardwiring, or any combination thereof. For example, the CPU 132 may include a general-purpose or special-purpose digital data processor programmed with software in a conventional manner. Memory 134 may temporarily store transitory information and allow the CPU 132 to quickly access the stored information. The storage device 136 may store more-permanent information in a non-volatile manner. For example, the storage device 136 may store a database of service-level agreements (SLAs) between the proprietor of the management system 120 and the users. The I/O components 138 may be connected to system interfaces. All of these elements in the computer 130 are interconnected using an internal bus 140. In addition, the computer 130 may include one or more external links 142 for connecting the computer 130 to elements in the infrastructure platform of the cloud service provider 102 and/or the user devices/terminals 122.

The memory 134 may include instructions for low-level operation of the computer 130, such as operating-system instructions, device-driver-interface instructions, or any other suitable instructions. The operating system is not limited to any particular type; rather, any operating system (such as WINDOWS, LINUX, or OSX) and/or other instructions are within the scope of the present invention. As further described below, the memory 134 may include an operating system 144 for directing the execution of low-level, basic system functions such as memory allocation, file management and operation of the main memory 134 and/or storage device 136. In addition, the memory 134 may include instructions, such as a delegation module 152 for delegating the received workload to one or more VMs 104 for execution; an instance-identification module 154 for identifying, for each of the VMs 104, one or more reserved instances, each specifying a template providing computational resources compatible with the feasible resource template for running the VM for a fixed time period (e.g., 1 year or 3 years); a ranking module 156 for creating, for each VM, an instance-ranking list indicating a ranking order of the identified reserved instances and/or a VM-ranking list indicating a ranking order of the VMs to which the resources specified by the templated of the reserved instance may be allocated; a mapping module 158 for generating a mapping of each of the VMs to one of the reserved instances based on the instance-ranking list and the VM-ranking list; a resource-allocation module 160 for allocating the computational resources from the templates specified by the reserved instances to the corresponding VMs based on the mapping; and a VM-monitoring module 162 for continuously monitoring the status of each VM and/or the computational resources required by each VM as further described below.

In operation, the computing workload may be first deployed in the cloud-based environment by the user and/or the management system 120 via the terminal 124 and/or interface 126; optionally, the applications underlying a workload may be stored in the memory 134, storage device 136 and/or any memory/storage device accessible to the cloud-service provider 102. In one embodiment, the application includes multiple application components for executing one or more computing functions on one or more of the VMs 108. An example an application may be a NETFLIX transaction-processing application; one function of the transaction application may be a recommendation generator that gives the customer recommendations for additional movies. The management system 120 may delegate execution of the function(s) to one or more VMs 104 and/or manage function execution in the cloud-based environment 100. Function execution may be triggered by, for example, a user request and/or other relevant events, such as changes to the pertinent data saved in memory 134.

Figure 2A:
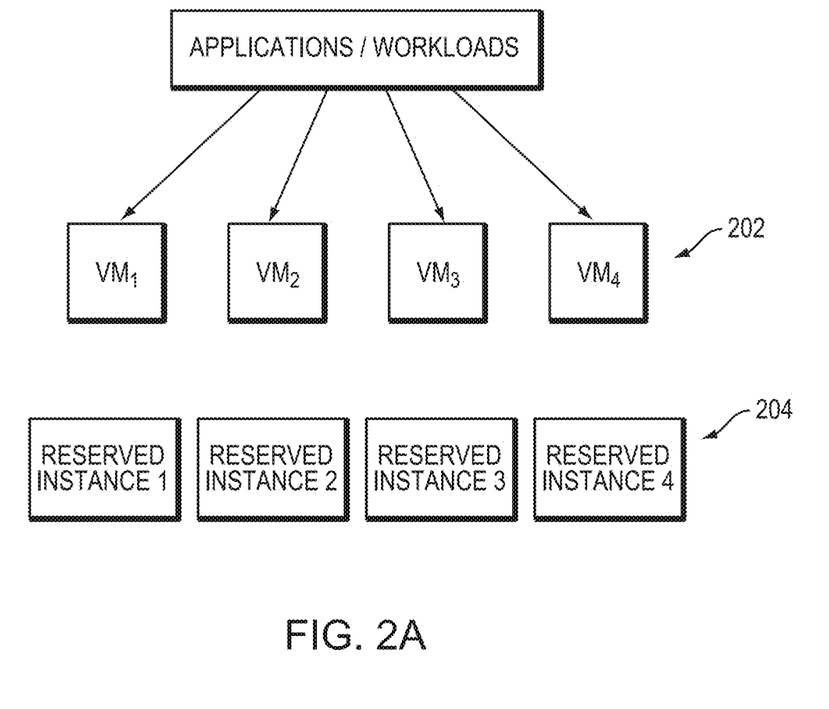
FIG. 2A depicts multiple VMs for executing one or more applications/workloads uploaded by the user and multiple reserved instances specifying templates that have the types and/or sizes of the computational resources feasible for executing the VMs in accordance with various embodiments of the current invention.

In various embodiments, the consumer has paid for one or more reserved instances, each specifying a template having the same or different types and/or amounts of computational resources; information about the paid reserved instance 204 can be stored in a database 164 in memory 134 and/or storage 136. The database 164 may be periodically (e.g., daily) updated to reflect a change in the reserved instances due to a new purchase and/or expiration of the purchase term. The management system 120 implements an optimization approach to allocating computational resources from different types and/or sizes of the templates specified by the reserved instances to the VMs 104 for executing one or more workloads. The management system 120 may advantageously maximize cost savings using reserved instances while satisfying the performance requirements of the VMs. With reference to FIG. 2A, in one implementation, the management system 120 first delegates the received workload(s) to one or more VMs 202 for execution. In addition, the management system 120 may access the database 164 storing information about the reserved instance 204 to identify, for each VM 202, one or more reserved instances 204 corresponding to the templates that have the types and/or sizes associated with the computational resources feasible for executing the VM 202. For example, the instance-identification module 154 may identify reserved instances specifying the templates that provide sufficient resources to satisfy the minimal performance requirements (e.g., latency, bandwidth, capacity, etc.) of the VMs without violating the constraints (e.g., template exclusions) imposed by the user and/or the cloud-service provider 102. In one embodiment, one or more VMs include encrypted drives; thus, the templates feasible for running the VM have to support such a configuration.

Additionally or alternatively, the management system 120 may monitor available cloud-based resource offerings so that, when new reserved instances are needed, the optimal selections are made. For example, memory 134 and/or storage 136 may include a database 136 of cloud-service providers and their reserved-instance offerings, represented in a common framework of resource specifications so that they can be compared and matched to workloads delegated to the VMs 204. Similar to the approach described above, the management system 120 may access the database 166 to identify the reserved instances that provide sufficient resources to satisfy the minimal performance requirements of the VMs without violating the constraints. In addition, the database 136 may be periodically updated by "crawling" the offerings listed publicly by cloud providers.

Figure 2B:
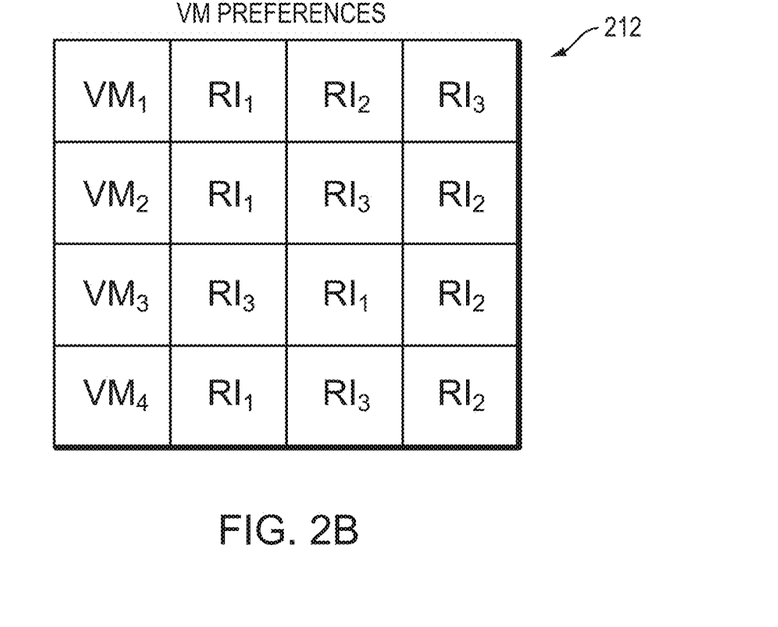
FIGS. 2B and 2C depict an exemplary instance-ranking list and an exemplary VM-ranking list, respectively, in accordance with various embodiments of the current invention.
Figure 2C:
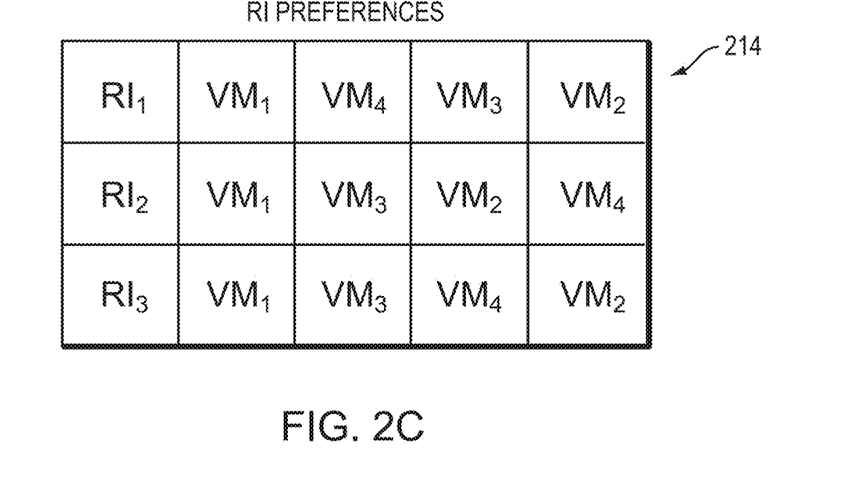

As shown in FIGS. 2B and 2C, VMs may have ranked "preferences" in terms of reserved instances that are specific to features of the particular VM, while reserved instances may also be assigned preferences relative to VMs; these relative preferences are used to optimize allocation of available reserved instances among the VMs. With reference to FIG. 2B in particular, VM preferences may involve considerations of cost, performance, and overall convenience. Thus, based on the identified VMs 202 and reserved instances 204, an instance-ranking list 212, indicating a ranking order of the identified reserved instances 204 for each VM 202, may be created. For example, as depicted, the ranking order for $VM_1$ lists reserved instances 1, 2, 3 as its first, second and third preferences, respectively; the ranking order for $VM_2$ lists reserved instances 1, 3, 2 as its first, second and third preferences, respectively; and so on. The ranking order may be based on one or more priority factors, which may themselves be ranked in importance. The following discussion of priority-factor ranking is provided for explanatory purposes; the importance of a particular priority factor relative to others represents a design choice and, indeed, may vary over time or among VMs.

In one embodiment, the cost savings associated with each of the reserved instances is the first priority factor—i.e., for each VM, the reserved instance that provides the most cost savings after being associated with the VM is preferred over others. For example, the highest-ranked reserved instance may contain the smallest feasible set of resources (compatible with execution needs and maximum utilization restrictions) provided over the longest acceptable time period.

In some embodiments, the reserved instances have instance size flexibility (ISF) that allows the cost savings of a reserved instance to apply to a template belonging to a particular family of instance types rather than a specific instance type. As a result, an instance can be scaled up with charges for the additional resources based on, e.g., on-demand pricing. As a result, the utilized resources will only be partially discounted, but this still may be preferable than moving up to a larger reserved instance which, while fully discounted, may be too large and result in substantial unused capacity. Thus, reserved instances with ISF may be preferred over reserved instances without ISF, and among ISF reserved instances, preference may be given to the one that results in the largest overall cost savings.

If two or more reserved instances provide the same discount, the ranking module 156 may rank the reserved instances, on behalf of the various VMs, based on the second-ranking priority factor— e.g., affinity (such as billing affinity) between the VM and each of the reserved instances. For example, AWS typically provides the customer a daily bill including information about the VMs that are currently discounted by the reserved instances. Thus, if a reserved instance from that provider is already associated with the VM, the VM may give preference to this reserved instance over others to reflect the value of avoiding payment under a different provider discounted by another reserved instance. Of course, billing affinity may also result in a higher discount reflecting increased purchases from the same provider. In some situations, two or more reserved instances have tie scores based on the first and second priority factors (e.g., providing the same discount and having no billing affinity), in which case the ranking module 156 may rank the reserved instances based on the third priority factor—e.g., usage constraints associated with the reserved instances. For example, the VM may give preference to reserved instances with ISF. In various embodiments, the fourth priority factor that can be relied on when creating the instance-ranking order is whether the VM must be moved to take advantage of a candidate reserved instance, and if so, the cost associated with the move. For example, if the VM is already associated with the same instance type as that of one of the reserved instances and does not require any scaling to be associated with that reserved instance, the VM may prefer that reserved instance over others.

Additionally, with reference to FIG. 2C, the ranking module 156 may create, for each of the identified reserved instances, a VM-ranking list 214 indicating a ranking order of the VMs to which the resources specified by the reserved instance may be allocated—and representing, in effect, ranked "preferences" of each reserved instance for the VMs. The preference criteria among reserved instances correspond to considerations relevant to resource provision (whereas the VM preference criteria correspond to considerations relevant to resource consumption). For example, the ranking order for reserved instance 1 lists $VM_1$, $VM_4$, $VM_3$, and $VM_2$ as its first, second, third and fourth preferences, respectively; similarly, the ranking order for reserved instance 2 lists $VM_1$, $VM_3$, $VM_2$ and $VM_4$ as its first, second, third and fourth preferences, respectively; and so on. Similar to creation of the instance-ranking list 212, in various embodiments, cost savings may be the first priority factor when creating the VM-ranking order—i.e., the reserved instance gives preference to the VM that will achieve the greatest cost saving. In addition, when two VMs provide the same cost saving, the ranking module 156 may rank the VMs based on the second priority—e.g., billing affinity between the reserved instance and each of the VMs. Again, if the VM is already associated with a reserved instance, the reserved instance may give preference to such a VM over others. When two or more VMs have tie scores for the first and second priority factors (e.g., having the same amount of cost saving and having no billing affinity for the reserved instance), the ranking module 156 may rank the VMs, on behalf of the reserved instances, based on the VM movements or modifications required for use of each of the reserved instances. For example, if one of the VMs is already associated with the same instance type as that of a particular reserved instance and therefore does not require any scaling to be associated with that reserved instance, the reserved instance may give this VM given preference over others. If, however, neither of the VMs is associated with the same instance type as that of the particular reserved instance, the ranking module 156 may rank the VMs based on the family of the instance type associated with the reserved instance. For example, if one of the VMs is associated with the same family of the instance type as that of the reserved instance, such a VM is given preference over the other.

It should be noted that the priority factors (e.g., cost savings, billing affinities, family affinities, ISF/non-ISF reserved instances, constrained usages and/or required movements of the VMs for associations) utilized for creating the instance-ranking list 212 and/or VM-ranking list 214 described above are exemplary only; any other factors relevant to associating the reserved instances with the VMs can be used to create the instance-ranking list 212 and/or VM-ranking list 214 and are thus within the scope of the present invention. In addition, the order of the priority factors may be adjusted based on evolving criteria relative to VMs and reserved instances, i.e., their "perspectives" may change over time in terms of the importance attached to various criteria.

Figure 3:
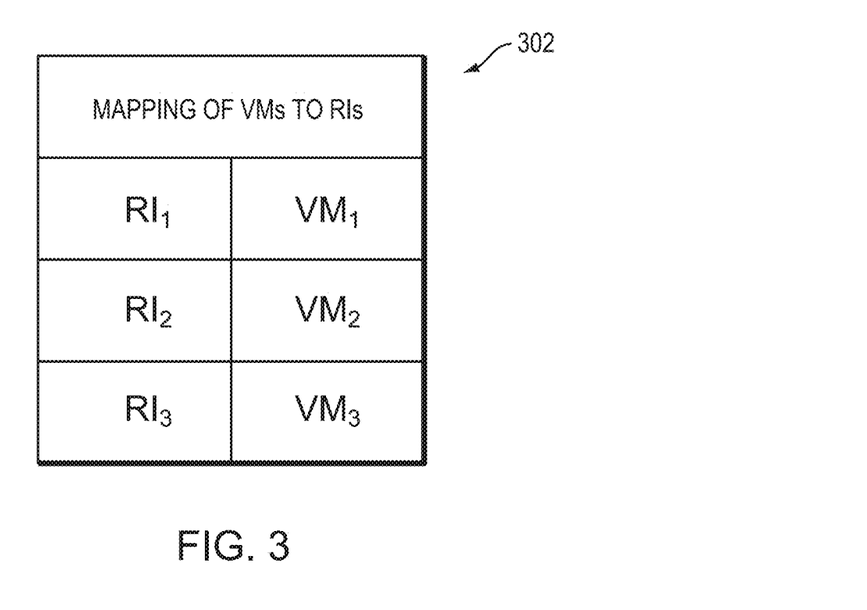
FIG. 3 depicts an exemplary mapping of the VMs to the corresponding reserved instances in accordance with various embodiments of the current invention.

In various embodiments, once the instance-ranking list 212 and the VM-ranking list 214 are created, the mapping module 158 may be used to generate a mapping of each of the VMs 202 to one of the reserved instances 204. For example, the mapping module 158 may model the mapping as a "stable marriage problem" and can implement the well-known Gale-Shapley algorithm to solve the problem. The Gale-Shapley algorithm generates the mapping based on the preference order of the reserved instances for each VM and the preference order of the VMs for each reserved instance listed in, respectively, the instance-ranking list 212 and the VM-ranking list 214. For example, referring to FIG. 3A, the mapping module 158 may first associate reserved instance 1 with $VM_1$ since $VM_1$ is the most preferred VM on the preference list of reserved instance 1. Thereafter, other reserved instances (e.g., reserved instances 2 and 3) will not be able to associate themselves with $VM_1$ since reserved instance 1 is also the most preferred reserved instance on the preference list of $VM_1$. As a result, $VM_1$ and reserved instance 1 now form a "stable engagement". To associate reserved instance 2 with a VM, the mapping module 158 may first choose $VM_3$, which is the second preferred VM on the preference list of reserved instance 2. Thereafter, the mapping module 158 may also choose $VM_3$ to be associated with reserved instance 3 since $VM_3$ is also the second preferred VM on the preference list of reserved instance 3. To determine which reserved instance is to be associated with $VM_3$, the mapping module 158 may access the instance-ranking list 212 to obtain the preference of $VM_3$. In this example, $VM_3$ prefers reserved instance 3 over reserved instance 2. Thus, even if $VM_3$ has previously been associated with reserved instance 2, the mapping module 158 may change the association—i.e., associating $VM_3$ with reserved instance 3 instead. Thereafter, the mapping module 158 may identify the next-preferred VM (i.e., $VM_2$) on the preference list of reserved instance 2 and associate reserved instance 2 with this VM. This way, all reserved instances 1, 2, 3 can form stable marriages with $VM_1$, $VM_2$, and $VM_3$, respectively.

It should be noted that although FIG. 3 depicts one reserved instance supporting one VM, it is possible that one reserved instance can support multiple VMs. In addition, the Gale-Shapley algorithm described above represents an exemplary approach for generating the mapping 302 only; any other approaches suitable for generating the mapping 302 of each of the VMs to one of the reserved instances can be used and are therefore within the scope of the present invention. In various embodiments, once the mapping 302 is generated, the resource-allocation module 160 allocates computational resources from the templates specified by the reserved instances to the corresponding VMs based on the mapping 302. This approach may optimally apply the reserved instances to the VMs to provide the largest amount of cost savings while ensuring satisfaction of the VM performance (e.g., having a utilization rate below a target utilization rate, having a latency below an acceptable latency, etc.).

In various embodiments, the VMs may change in terms of resource requirements during execution. In addition, the VM currently responsible for a workload may be suspended for any of various routine reasons and a new VM activated in its place. In various embodiments, the management system (e.g., the VM-monitoring module 162) can continuously monitor the status of each VM and/or the computational resources required for executing each VM. Based thereon, one or more of the VMs may be continuously scaled to maximize cost savings while ensuring satisfaction of VM performance criteria. For example, if a computational resource in $VM_1$ has a utilization rate exceeding a predetermined value (e.g., 80%), a larger amount of the resource must be allocated to $VM_1$ in order to satisfy the performance criteria. In one embodiment, upon receiving such information, the management system 120 (e.g., the instance-identification module 154) identifies one or more reserved instances specifying one or more templates that can provide the newly required amount of the computational resource to $VM_1$. These reserved instances may or may not be currently associated with other VMs. Subsequently, the management system 120 (e.g., the ranking module 156) may update the instance-ranking list 212 associated with $VM_1$ (and, in some embodiments, other VMs such as $VM_2$, $VM_3$ and $VM_4$) based on the priority factors described above. If necessary, the ranking module 156 may also update the VM-ranking list 214. Based on the updated instance-ranking list 212 (and, in some embodiments, the VM-ranking list 214), the mapping module 158 may update the mapping of each VM to one of the reserved instances using the Gale-Shapley algorithm described above. In addition, the resource-allocation module 160 may then, based on the updated mapping, allocate the computational resources from the templates specified by the reserved instances to the corresponding VMs.

Conversely, if the computational resource in $VM_1$ is under-utilized (e.g., having a utilization below a predetermined value such as 20%), a lesser amount of the resource may be sufficient to maintain the required performance. Again, upon receiving such information, the management system 120 (e.g., the instance-identification module 154) may identify the reserved instances specifying the templates that provide less of the computational resource. The identified reserved instances may or may not be currently associated with other VMs. Thereafter, the management system 120 (e.g., the ranking module 156) may update the instance-ranking list 212 associated with $VM_1$ (and, in some embodiments, other VMs such as $VM_2$, $VM_3$ and $VM_4$) based on the priority factors described above; and also based thereon, the mapping module 158 may update the mapping of each VM to one of the reserved instances using the Gale-Shapley algorithm. The resource-allocation module 160 can then allocate the computational resources from the templates specified by the reserved instances to the corresponding VMs based on the updated mapping.

Similarly, when a new VM is activated, the management system 120 may identify the reserved instances 204 representing templates that are feasible for executing the new VM and may update, based on the priority factors described above, (i) the instance-ranking list 212 by including the ranking order of the reserved instances for the newly activated VM and (ii) the VM-ranking list 214 by including the newly activated VM. Based on the updated lists 212, 214, the management system 120 may create a new mapping of the newly activated VM and, in some embodiments, other currently activated VMs to the corresponding reserved instances. In addition, the management system can then allocate computational resources from the templates specified by the reserved instances to the corresponding VMs based on the new mapping. If one of the currently activated VMs is suspended, the management system 120 may update (i) the VM-ranking list 214 for each of the reserved instances and (ii) the mapping of the VMs to the reserved instances based on the updated VM-ranking list 214 and, subsequently, allocate the resources from the templates specified by the reserved instances to the corresponding VMs based on the updated mapping.

Accordingly, various embodiments hereof continuously monitor the usage of the computational resources in each VM and/or the status of each VM, and based thereon, continuously scale one or more of the VMs to the reserved instances so as to optimally apply the reserved instances (e.g., providing the most cost savings) while ensuring satisfaction of VM performance criteria.

Figure 4:
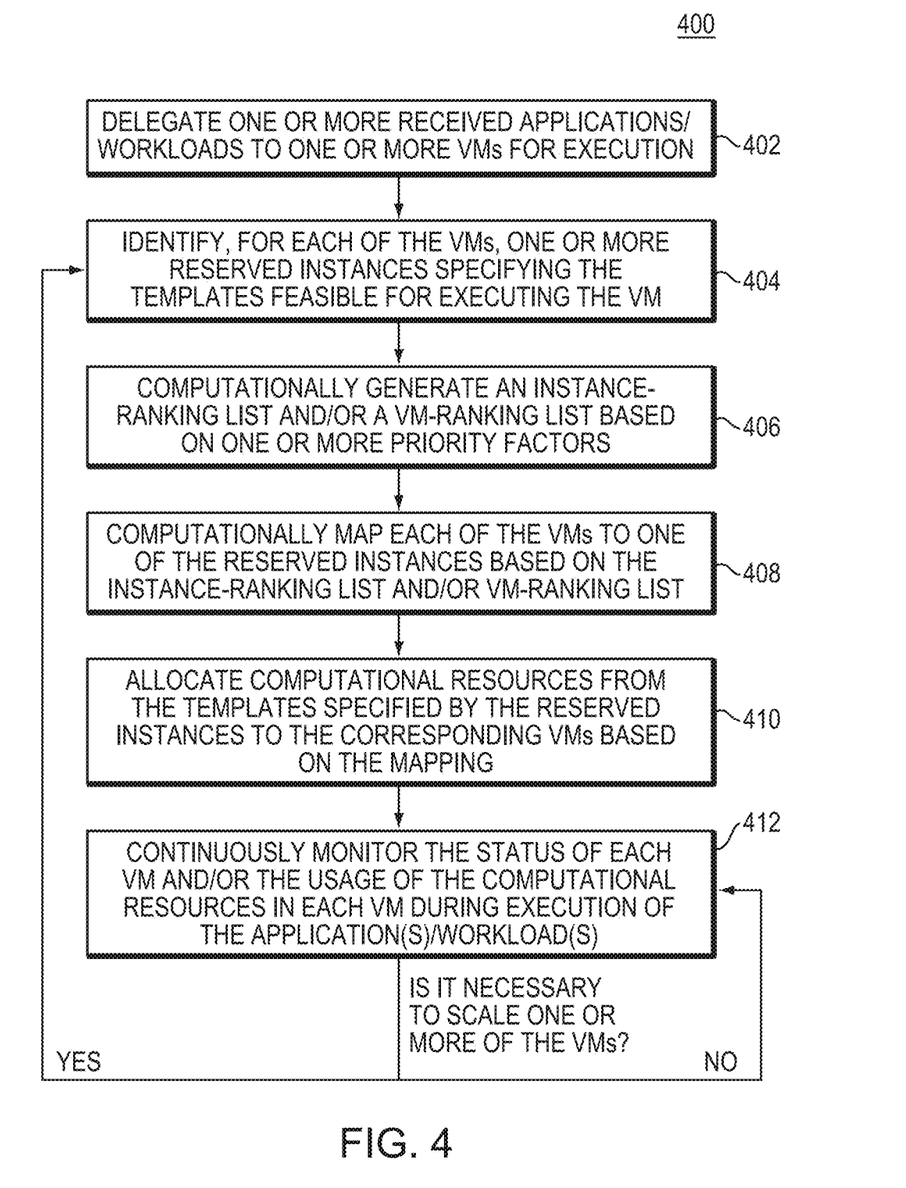
FIG. 4 is a flow chart illustrating an exemplary approach for allocating computational resources from one or more templates specified by one or more reserved instances to one or more VMs in accordance with various embodiments of the current invention.

FIG. 4 illustrates an exemplary approach 400 for optimally associating the computational resources from one or more templates specified by one or more reserved instances to one more VMs (e.g., providing the most cost savings) while ensuring that VM performance criteria are satisfied in accordance herewith. In a first step 402, the management system 120 (e.g., delegation module 152), upon receiving one or more applications or workloads from the user, delegates the workloads to one or more VMs for execution. In addition, the management system 120 (e.g., instance-identification module 154) identifies, for each of the VMs, one or more reserved instances specifying the templates feasible for executing the VM (in a second step 404). The management system 120 (e.g., ranking module 156) can then create an instance-ranking list 212 indicating a ranking order of the identified reserved instances for each VM and/or a VM-ranking list 214 indicating a ranking order of the VMs for each of the identified reserved instances (in a third step 406). The instance-ranking list 212 and/or VM-ranking list 214 may be created based on multiple priority factors. For example, the ranking order of the reserved instances in the instance-ranking list may be determined based on the following order of priorities: (i) the cost savings associated with the reserved instances, (ii) affinities (e.g., billing affinities) between the VMs and reserved instances, (iii) usage constraints associated with the reserved instances, and (iv) whether VMs must be moved (and the costs associated with any such move) in order to be associated with the reserved instances. Whether a VM must be moved may be determined based on the associations between the VMs and the instance types of the reserved instances. In addition, the order of the VM-ranking list may be determined based on the following order of priorities: (i) the cost savings associated with VMs, (ii) affinities (e.g., billing affinities) between the reserved instances and the VMs, (iii) whether VMs must be moved (and the costs associated with any such move) based on the associations between the instance types of the reserved instances and the VMs, and (iv) the association between the families of the instance types to which the reserved instances belong to and the VMs. Once the instance-ranking list 212 and the VM-ranking list 214 are created, the management system 120 (e.g., mapping module 158) can, based thereon, generate a mapping of each of the VMs to one of the reserved instances (in a fourth step 408). In one embodiment, the management system 120 implements the Gale-Shapley algorithm to generate the mapping. Thereafter, the management system 120 (e.g., resource-allocation module 160) can allocate the computational resources from the templates specified by the reserved instances to the corresponding VMs based on the mapping (in a fifth step 410).

In various embodiments, the management system 120 (e.g., VM-monitoring module 162) continuously monitors the status of each VM and/or the usage of the computational resources in each VM during execution of the associated workload(s) to determine whether it may be necessary to scale one or more of the VMs (in a sixth step 412). For example, if one of the VMs is suspended or the computational resources in one of the VMs are under-utilized (e.g., having a utilization rate below a predetermined value such as 20%), the management system 120 may shift the reserved instance currently associated with this VM to a different VM. Alternatively, if a VM is newly activated or the computational resources in one of the currently activated VM are over-utilized (e.g., having a utilization rate exceeding a predetermined value such as 80%), the management system 120 may associate a new reserved instance to this VM (i.e., scaling the VM). If the management system 120 determines that it is necessary to scale the VM, the management system 120 (e.g., instance-identification module 154) may identify the reserved instances specifying the templates feasible for executing the VM as described in step 404 and then perform steps 406-412 to allocate the computational resources from a template specified by a new or different reserved instance to the VM. Steps 404-412 may be iteratively performed until execution of the workload(s) is complete.

In general, the modules including the delegation module 152, instance-identification module 154, ranking module 156, mapping module 158, resource-allocation module 160 and VM-monitoring module 162 described above may be implemented in hardware, software, or a combination of both, whether integrated within the CPU 132, or provided by a separate external processor or other computational entity or entities.

In addition, the manager system 120 may include one or more additional modules implemented in hardware, software, or a combination of both to perform functionality described above. For embodiments in which the functions are provided as one or more software programs, the programs may be written in any of a number of high level languages such as PYTHON, FORTRAN, PASCAL, JAVA, C, C++, C#, BASIC, TENSORFLOW, THEANO, KERAS, PYTORCH, various scripting languages, and/or HTML. Additionally, the software can be implemented in an assembly language directed to the microprocessor resident on a target computer; for example, the software may be implemented in Intel 80×86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM. Embodiments using hardware circuitry may be implemented using, for example, one or more FPGA, CPLD or ASIC processors.

The terms "computational resources," "computer resources," "computational resources," "computing resources," and "computational commodities" are used herein interchangeably. Further, it is to be understood that the features of the various embodiments described herein are not necessarily mutually exclusive and can exist in various combinations and permutations, even if such combinations or permutations are not made express herein, without departing from the spirit and scope of the invention. In fact, variations, modifications, and other implementations of what is described herein will occur to those of ordinary skill in the art without departing from the spirit and the scope of the invention. In addition, although the description herein refers to the resource reservations as reserved instances offered by AWS, they can be other reservation models offered by other cloud-service providers (e.g., Microsoft Azure).

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of allocating resources to a plurality of virtual machines (VMs), each of the VMs being associated with a feasible resource template specifying minimum resources required to execute the VM, the method comprising:
   uploading a workload to at least one VM of the plurality of VMs for execution of the workload;
   identifying a plurality of reserved instances (RIs), wherein each RI specifies a set of computational resources that is compatible with the feasible resource template associated with the at least one VM for execution of the workload for a fixed time period;
   computationally generating, for the at least one VM, an instance-ranking list indicating a ranking order of the RIs having templates that are compatible with the feasible resource template associated with the at least one VM;
   computationally generating, for each RI, a VM-ranking list indicating a ranking order of the VMs to which the set of computational resources specified by each RI may be allocated;
   based at least in part on the instance-ranking list and the VM-ranking list, computationally mapping the at least one VM to a corresponding RI of the RIs;
   allocating the set of computational resources specified by the corresponding RI to the at least one VM based on the mapping; and
   monitoring a use of the set of computational resources by the at least one VM using a processor that tracks actual resource utilization over time to determine if the set of computational resources allocated to the at least one VM needs to be updated to execute the workload.

2. The method of claim 1, wherein the ranking order of the RIs in the instance-ranking list and/or the ranking order of the VMs in the VM-ranking list is determined based on at least one priority factor selected from the group consisting of a cost saving, an affinity between the VMs and the RIs, an association between the VMs and an instance type of each RI, an association between the VMs and a family of the instance type to which each RI belongs, and a usage constraint associated with each RI.

3. The method of claim 2, wherein, for each RI, the ranking order of the VM-ranking list is determined based on the following order of priority factors: (i) the cost saving associated with the VMs, (ii) the affinity between each RI and the VMs, (iii) the association between the instance type of each RI and the VMs, and (iv) the association between the family of the instance type to which each RI belongs to and the VMs.

4. The method of claim 2, wherein, for the at least one VM, the ranking order of the Ms in the instance-ranking list is determined based on the following order of priority factors: (i) the cost saving associated with each RI, (ii) the affinity between the at least one VM and each RI of the RIs, (iii) the usage constraint associated with each RI, and (iv) the association between the at least one VM and the instance type of each RI.

5. The method of claim 1, wherein the set of computational resources specified by each RI are allocated to a different one of the VMs.

6. The method of claim 1, wherein the set of computational resources specified by one of the RIs are allocated to two or more of the VMs.

7. The method of claim 1, wherein the mapping is computationally generated using Gale-Shapley algorithm.

8. The method of claim 1, wherein the set of computational resources are selected from the group consisting of CPUs, memory, databases, network bandwidth, and input-output capacity.

9. A computer system for allocating resources to a plurality of virtual machines (VMs), each of the VMs being associated with a feasible resource template specifying minimum resources required to execute the VM, the computer system comprising:
   a processor; and
   a computer memory including stored instructions, executable by the processor, for causing the processor to:
   upload a workload to at least one VM of the plurality of VMs for execution of the workload;
   identify a plurality of reserved instances (RIs), wherein each RI specifies a set of computational resources that is compatible with the feasible resource template associated with the at least one VM for execution of the workload for a fixed time period;
   generate, for the at least one VM, an instance-ranking list indicating a ranking order of the RIs having templates that are compatible with the feasible resource template associated with the at least one VM;
   generate, for each RI, a VM-ranking list indicating a ranking order of the VMs to which the set of computational resources specified by each RI may be allocated;
   based at least in part on the instance-ranking list and the VM-ranking list, map the at least one VM to a corresponding RI of the RIs;
   allocate the set of computational resources specified by the corresponding RI to the at least one VM based on the mapping; and
   monitor a use of the set of computational resources by the at least one VM using the processor that tracks actual resource utilization over time to determine if the set of computational resources allocated to the at least one VM needs to be updated to execute the workload.

10. The computer system of claim 9, wherein the ranking order of the RIs in the instance-ranking list and/or the ranking order of the VMs in the VM-ranking list is determined based on at least one priority factor selected from the group consisting of a cost saving, an affinity between the VMs and the RIs, an association between the VMs and an instance type of each RI, an association between the VMs and a family of the instance type to which each RI belongs, and a usage constraint associated with each RI.

11. The computer system of claim 10, wherein, for each RI, the ranking order of the VM-ranking list is determined based on the following order of priority factors: (i) the cost saving associated with the VMs, (ii) the affinity between each RI and the VMs, (iii) the association between the instance type of each RI and the VMs, and (iv) the association between the family of the instance type to which each RI belongs to and the VMs.

12. The computer system of claim 10, wherein, for the at least one VM, the ranking order of the RIs in the instance-ranking list is determined based on the following order of priority factors: (i) the cost saving associated with each RI, (ii) the affinity between the at least one VM and each RI, (iii) the usage constraint associated with each RI, and (iv) the association between the at least one and the instance type of each RI.

13. The computer system of claim 9, wherein the set of computational resources specified by each RI are allocated to a different one of the VMs.

14. The computer system of claim 9, wherein the set of computational resources specified by one of the Ms are allocated to two or more of the VMs.

15. The computer system of claim 9, wherein the processor is further configured to computationally map the at least one VM to one of the RIs using Gale-Shapley algorithm.

16. The system of claim 9, wherein the set of computational resources are selected from the group consisting of CPUs, memory, databases, network bandwidth, and input-output capacity.

* * * * *